United States Patent [19]

Sandman, Jr.

[11] Patent Number: 5,538,769
[45] Date of Patent: Jul. 23, 1996

[54] GRAPHITE COMPOSITE SHAFT WITH REINFORCED TIP

[75] Inventor: Robert B. Sandman, Jr., Spirit Lake, Iowa

[73] Assignee: Berkley, Inc., Spirit Lake, Iowa

[21] Appl. No.: 417,653

[22] Filed: Apr. 5, 1995

[51] Int. Cl.$^6$ .............................. B32B 1/08; A63B 53/10; B29D 22/00
[52] U.S. Cl. .................... 428/36.3; 428/68; 428/36.9; 428/36.91; 428/36.92; 473/319
[58] Field of Search .................... 280/819; 428/68, 428/70, 36.3, 36.9, 36.91, 36.92; 273/80 R

[56] References Cited

U.S. PATENT DOCUMENTS 5,265,872  11/1993  Tennent et al. .
5,265,911  11/1993  Goode ..................................... 280/819
5,294,151   3/1994  Goode ..................................... 280/819
5,324,558   6/1994  Muto et al. .

*Primary Examiner*—Patrick J. Ryan
*Assistant Examiner*—Rich Weisberger
*Attorney, Agent, or Firm*—James W. Miller

[57] ABSTRACT

An improved graphite composite shaft which can be used in fishing rod or golf clubs includes a base shaft made at least partially of graphite composite material provided in one or more layers or plies. Each shaft has a relatively slender tip that is normally prone to impact damage. An outer concentric reinforcement layer made of a composite material having thermoplastic fibers, such as Vectran, Spectra, or the like, is provided on the base shaft. The reinforcement layer extends only part of the way up the length of the base shaft from the tip thereof. The reinforcement layer makes the shaft more resistant to impacts occurring at the tip, thus increasing the durability of the shaft without decreasing the performance of the fishing rods or golf clubs that incorporate the shaft.

16 Claims, 3 Drawing Sheets

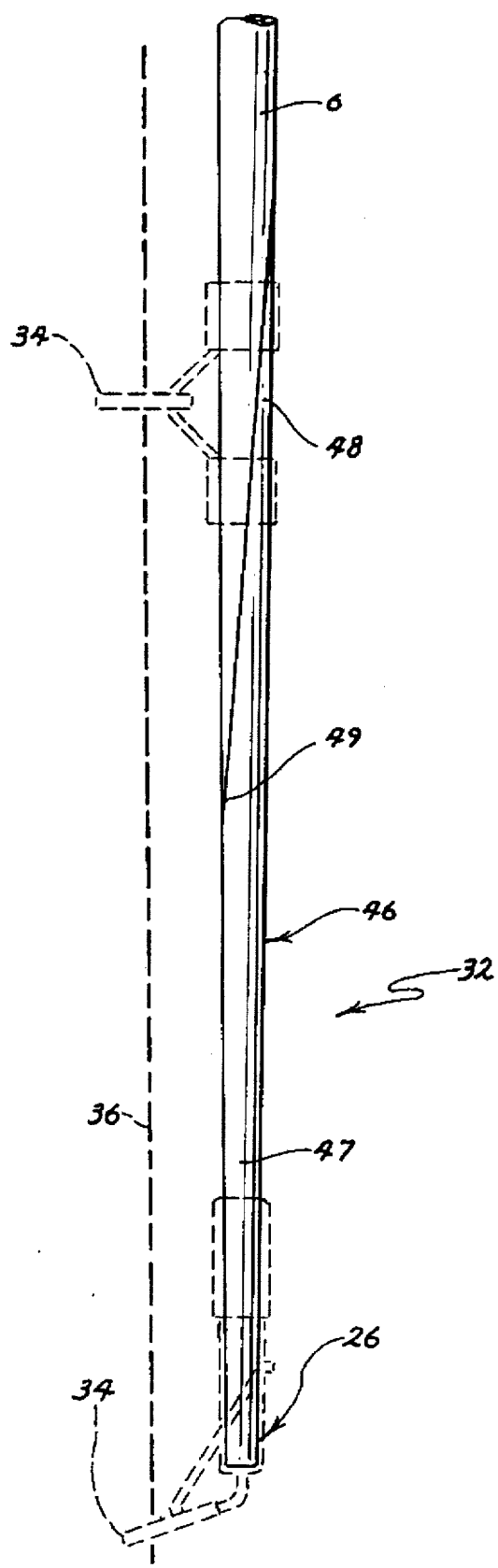
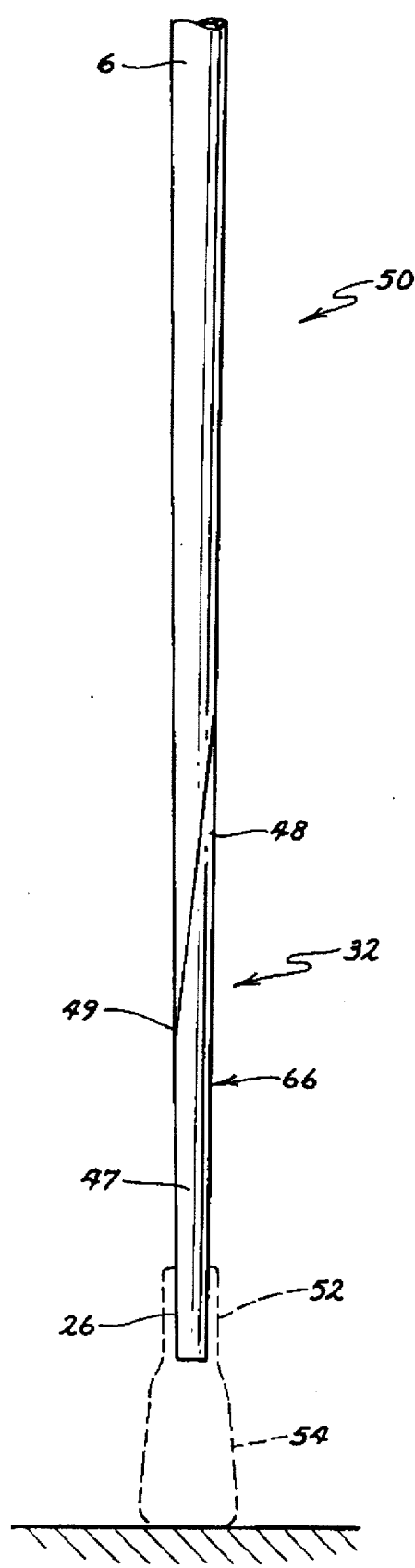

5,538,769

1

GRAPHITE COMPOSITE SHAFT WITH REINFORCED TIP

TECHNICAL FIELD

This invention relates to a graphite composite shaft having a reinforced tip. More particularly, this invention relates to such a shaft used in a fishing rod or a golf club.

BACKGROUND OF THE INVENTION

Graphite composite shafts are now used in many products as substitutes for shafts made from rigid materials such as steel, wood or the like. For example, many golf clubs and fishing rods now have graphite composite shafts. Graphite composite shafts are favored because they are both light and strong as well as being corrosion resistant.

However, conventional graphite composite shafts are still capable of experiencing impact damage, particularly at the tips of the shafts. For example, in a fishing rod made from a graphite composite shaft, the tip of the rod is quite slender as the rod tapers from the handle end to the rod tip. The rod tip will often be banged or jostled during use against a solid object, e.g. the bottom or sides of the fishing boat, with such impact exposing some of the graphite fibers and weakening the tip. Thus, the tip may subsequently break off the rod, thereby rendering it unfit for further use. Such impact damage and consequent rod tip failure is a major cause of warranty or other returns of fishing rods to the manufacturer.

Golf clubs having shafts made from graphite composite materials experience a similar, but more extreme, problem with impact damage at the shaft tip. Again, the shaft of the club usually tapers from one end to the other with the wider end being attached to the handle of the club and the narrower or slender end being attached to the club head. Since golf clubs are meant to be swung in proximity to the ground, it is not unusual for the club head to strike the ground with considerable force, applying a large force or torque to the narrowest portion of the shaft, i.e. to the tip of the shaft that is joined to the club head. Again, this impact can cause failure of the composite shaft at this point, causing the tip of the shaft to break at or closely adjacent the club head.

SUMMARY OF THE INVENTION

One aspect of this invention is to provide an improved shaft made at least partially of graphite composite materials which is better able to withstand impacts to the shaft tip.

These and other aspects of this invention relate to a shaft made of composite materials. This shaft comprises a base shaft made at least partially of graphite composite material and having a predetermined length between opposed ends thereof. The shaft further includes a reinforcement layer surrounding the base shaft at one end thereof and extending up the base shaft a distance which is substantially less than the predetermined length of the base shaft. The reinforcement layer is made of a composite material having thermoplastic fiber materials therein, whereby the reinforcement layer provides a reinforced tip at the one end of the base shaft to resist breakage of the tip.

BRIEF DESCRIPTION OF THE DRAWINGS

This invention will be described more completely in the following Detailed Description, when taken in conjunction with the following drawings, in which like reference numerals refer to like elements throughout.

2

Figure 1:
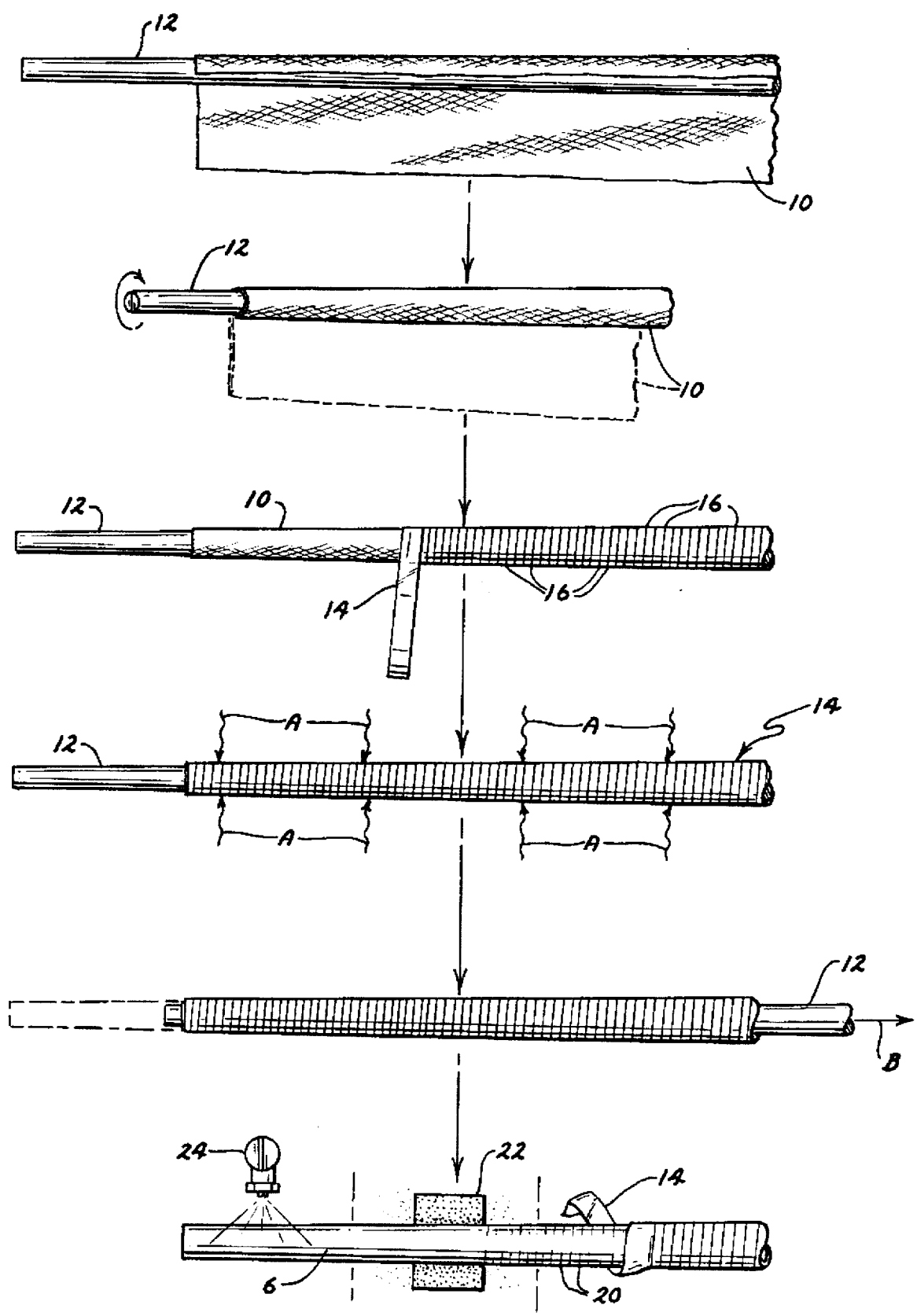
Figure 3:
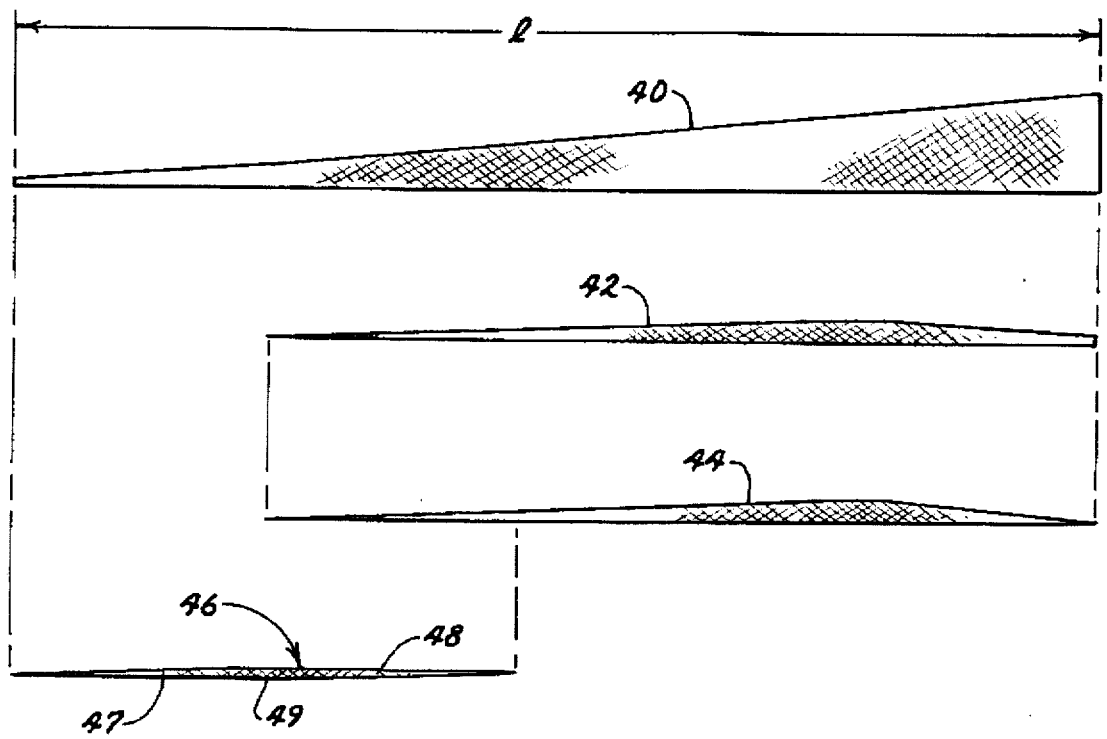
Figure 5:
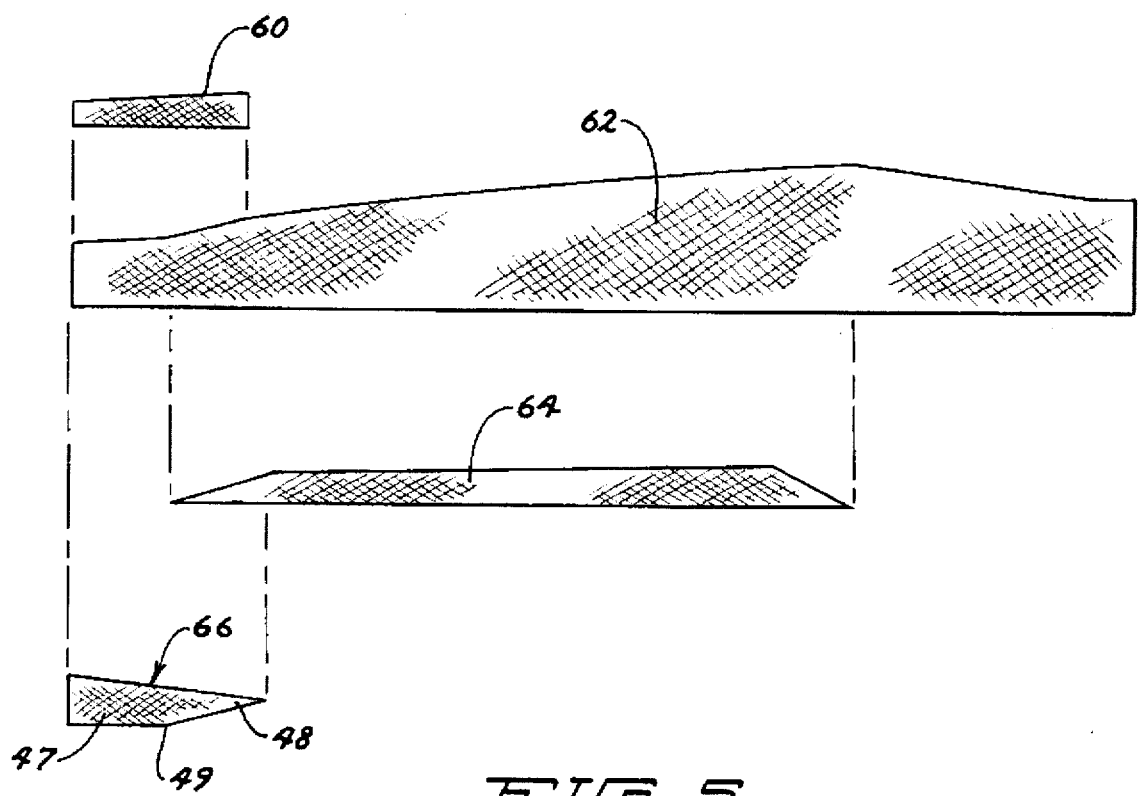

FIG. 1 is a flow chart illustration of a prior art method of making a hollow graphite composite shaft which sequentially shows the various steps of this prior art method;

FIG. 2 is an end elevational view of a portion of a fishing rod that incorporates a graphite composite shaft according to this invention, particularly illustrating the reinforcement layer at the tip of the graphite composite shaft which forms the tip of the fishing rod;

FIG. 3 is a top plan view of the various layers and relative shapes of materials used to make a hollow graphite composite shaft which is suited for use in a fishing rod as shown in FIG. 2, the innermost layers being at the top of FIG. 3 and the outermost layers at the bottom thereof;

FIG. 4 is an end elevational view of a portion of a golf club rod that incorporates a graphite composite shaft according to this invention, particularly illustrating the reinforcement layer at the tip of the graphite composite shaft where the shaft attaches to the head of the golf club; and FIG. 5 is a top plan view of the various layers and relative shapes of materials used to make a hollow graphite composite shaft which is suited for use as the shaft of a golf club, the innermost material layers being at the top of FIG. 5 and the outermost layers at the bottom thereof.

DETAILED DESCRIPTION

Referring first to FIG. 1, the major steps of the prior art method of making a straight graphite composite shaft are sequentially illustrated from top to bottom in flow chart fashion. These steps may be summarized as follows:

Applying sheet(s) of graphite composite material to a straight, non-flexible mandrel;

Wrapping the graphite composite material around the mandrel;

Compressing the wrapped graphite composite material on the mandrel

Heating the mandrel with the graphite composite material thereon to set or cure the graphite composite material and thereby form a solid graphite composite shaft;

Pulling the mandrel out of the formed graphite composite shaft; and

Finishing the formed graphite composite shaft.

As shown in the first step at the top of FIG. 1, graphite composite material is provided in sheets of such material, often referred to as pre-preg, that may be cut to any length or width. One such sheet is shown in FIG. 1 as 10. An elongated mandrel 12 is provided having a length at least as long, and preferably slightly longer, than shaft 6 that is to be formed. Mandrel 12 is formed of steel or some other suitably rigid, heat resistant material.

Mandrel 12 has a straight tubular or cylindrical form which is slightly tapered from one end to the other when one desires to form a tapered graphite composite shaft, as is true of that embodiment of graphite composite shaft 6 shown herein. In other words, one end of mandrel 12 has a cross-sectional area which is larger than the other end and mandrel 12 extends in a straight line between these two ends. In any event, the first step of the prior art method is to tack or overlie one or more sheets 10 of graphite composite material on mandrel 12 to apply the graphite composite material to mandrel 12.

The next step is to wrap the sheet(s) 10 of graphite composite material around mandrel 12. This can be done in many ways, but is conventionally done simply by rolling mandrel 12 in contact with a flat surface. Typically, mandrel 12 with the tacked graphite composite sheet(s) 10 is laid onto a planar surface, such as a table, and a rolling plate is lowered down into contact with mandrel 12. The rolling plate is then moved horizontally over the planar surface to, in effect, roll mandrel 12 to wrap sheet(s) 10 around mandrel 12 in the manner of a window shade. This wrapping step is illustrated in the second step of FIG. 1.

After mandrel 12 has been rolled to wrap the graphite composite material around mandrel 12, a shrink wrap, plastic tape 14 is wound around the graphite covered mandrel 12 from one end to the other. This is illustrated in the third step in FIG. 1. Tape 14 is shown having successive turns 16 which are slightly offset relative to one another along the length of mandrel 12 until the entire portion of mandrel 12 covered by graphite sheet(s) 10 is also covered by tape 14. The purpose of this taping step is to apply compression to the graphite composite material, namely to force the graphite composite material into tight contact with mandrel 12.

After mandrel 12 has been taped, it is then inserted into an oven or heating device to be heated to a temperature sufficient to cause the sheets of graphite composite material to be cured or transformed into a solid graphite composite shaft. The temperatures required for such heating, and the time needed for the heating step, are well known to those skilled in the art. The arrows denoted as A in the fourth step of FIG. 1 are meant to illustrate the application of heat to the taped, graphite covered mandrel to set or cure the graphite composite material.

After mandrel 12 has been heated at temperatures sufficiently high for a sufficiently long period to form a solid graphite composite shaft 6 out of graphite sheets 10, mandrel 12 is removed from the heating device. The next step comprises removing mandrel 12 from graphite composite shaft 6. This is done simply by pulling mandrel 12 out of shaft 6 from the larger end thereof. This is represented by the arrow B in the fifth step of FIG. 1 which illustrates a pulling force being applied to mandrel 12 to slide mandrel 12 out of the formed graphite composite shaft 6.

Typically, a fixture is provided for gripping the end of mandrel 12 which sticks out of the larger end of graphite composite shaft 6, this fixture having means for gripping or attaching to that end of mandrel 12. The fixture can be used to completely slide mandrel 12 out of shaft 6. Alternatively, the fixture can pull mandrel 12 only a short distance out of shaft 6 to break any seal that may have been formed between mandrel 12 and shaft 6 during the curing of the graphite composite material on mandrel 6. After such a seal is broken, the operator can then slide mandrel 12 the rest of the way out of shaft 6 by hand. Regardless of the exact manner of its removal, mandrel 12 is simply slid out of shaft 6 by pulling or pushing it out from one end thereof, i.e. from the larger end when shaft 6 is tapered.

Finally, the last step of the prior art shaft making method is to finish graphite composite shaft 6. This involves a number of finishing substeps which are shown from right to left in the sixth step of FIG. 1. The first substep is to unwrap the shrink wrap tape 14 from graphite composite shaft 6, as illustrated at 18. Because small parallel ridges 20 are usually formed on shaft 6 from the overlayment of the turns 16 of tape 14, these ridges 20 are then sanded off in the next finishing substep. This sanding substep is represented by the sander 22 which may be moved along the length of graphite composite shaft 6 to sand off ridges 20. After tape 14 is removed and any ridges 20 or other imperfections on the surface of shaft 6 are sanded off, the last finishing substep comprises painting or coating shaft 6 as represented by the paint sprayer 24. Following these finishing substeps, namely the substeps of unwrapping tape 14, of sanding shaft 6, and of then painting the shaft, shaft 6 is then in a finished form and may be used in other products, such as a golf club or fishing rod.

The prior art graphite composite shaft making method just described is well known to those in the business of making graphite composite shafts. Various modifications to some of these steps are also well known. For example, graphite composite material can be applied to mandrel 12 by means other than applying sheets 10 of such material to mandrel 12 and then wrapping those sheet 10 around mandrel 12. Some graphite composite material is provided in fiber or filament form that can simply be wound around mandrel 12 until mandrel 12 is covered with the graphite composite material. However, the basic shaft making method shown in FIG. 1 of applying graphite composite material to a mandrel, of curing the graphite composite material on mandrel 12 to form a rigid, graphite composite shaft, and of then sliding mandrel 12 out of shaft 6 is the basic method of shaft manufacture which is utilized herein to make the improved graphite composite shafts of this invention.

The graphite composite shafts 6 of this invention comprise shafts 6 which have a reinforced tip 26 to help make shaft 6 more impact resistant at tip 26. Specifically, shafts 6 with such reinforced tips 26 have been used by Applicant in fishing rods and golf clubs. As used in each of these applications, shaft 6 is tapered from the end of shaft 6 forming or attached to the handle of the fishing rod or golf club to the other more narrow end of shaft 6, described as tip 26 herein. While either end of shaft 6 forms a tip and could logically have the reinforcement to be described herein, such reinforcement is most needed at the narrower end or tip 26 of shaft 6.

Thus, in a fishing rod, the reinforced tip 26 is at that end of shaft 6 which forms the free upper end of the rod that is opposite to the handle. In a golf club, the reinforced tip 26 is at that end of shaft 6 that is attached to the hosel of the club head.

Referring more particularly to FIGS. 2 and 3, a first embodiment of the invention is shown comprising a graphite composite shaft 6 used to form a fishing rod 30. FIG. 2 illustrates the free end of fishing rod 30 adjacent tip 26 of shaft 6. The reinforcement layer of shaft 6 is identified as 32. As can be seen, such a fishing rod 30 will typically have a number of line guides, shown at 34, through which a fishing line 36 will pass. Only tip 26 of fishing rod 30 having reinforcement layer 32 is shown. Fishing rod 30 will extend a considerable distance from tip 26 to terminate in a handle end (not shown) having a grip that the fisherman uses to hold fishing rod 30.

FIG. 3 is a depiction of the various patterns 40, 42, 44 and 46 of materials which are used to make a typical graphite composite shaft 6 that is useful in a fishing rod 30 as shown in FIG. 2. In making such shaft 6, the manufacturing method depicted in FIG. 1 is employed. Thus, the material patterns as shown in FIG. 3 will be wrapped around mandrel 12 in the order shown with the uppermost pattern 40 in FIG. 3 being wrapped first and then proceeding progressively downwardly from top to bottom with the lowermost pattern 46 being wrapped last. Thus, the lowermost pattern 46 in FIG. 3 will comprise the outermost pattern or layer on the finished shaft 6.

The patterns retain the relative shapes, dimensions, and positions with respect to one another as shown in FIG. 3 as they are wrapped on mandrel 12. Thus, the first or uppermost pattern 40 runs the whole length of shaft 6 while the remaining patterns cover only a portion of the length of shaft 6. The first three patterns 40, 42 and 44 are primarily, but not necessarily exclusively, made of graphite composite material and form the "base" unreinforced shaft 6.

This invention comprises the addition of the last pattern 46 over only a portion of the length of shaft 6 at tip 26 to form reinforcement layer 32. The reinforcement layer 32 provided by the last pattern 46 is made from a composite material having a resin matrix that carries high strength thermoplastic fiber materials, such as Vectran, Spectra, Rayon, polyester or nylon. Vectran is a well known brand name for certain wholly aromatic polyester fibers. Spectra is a well known brand name for certain extended chain polyethylene fibers.

Referring again to FIG. 3, each pattern 40–46 may comprise a single ply or multiple plies as identified below:

TABLE I

| Pat. No. | Ply Count | Fiber Orientation | Material Description |
|---|---|---|---|
| 40 | 2 | 0°, n.a. | Graphite Composite Material NCT303-G120(MR40)-24 Newport (1st ply) and Fiberglass Scrim (2nd ply) |
| 42 | 2 | 0°, n.a. | Graphite Composite Material NCT303-G120(MR40)-24 Newport (1st ply) and Fiberglass Scrim (2nd ply) |
| 44 | 1 | 0° | Graphite Composite Material HM 12000 Hercules IM7; |
| 46 | 1 | 0° | NCT - 301 Newport Vectran |

As noted earlier, in manufacturing fishing rod 30 using the above-identified patterns, all of the various plies would be wrapped around a mandrel and then cured together to form an integral one-piece solid graphite composite shaft 6 as described in the method of FIG. 1. In so doing, the last partial pattern 46 made from the Vectran reinforced composite material forms the outermost reinforcement layer 32 of shaft 6 at tip 26 thereof, with the other patterns 40, 42 and 44 forming the base shaft 6.

The improvement of this invention is basically the addition of the reinforcement layer 32 only at tip 26 of shaft 6. The patterns 40, 42 and 44 illustrated in the formation of the base shaft 6 simply comprise a representative illustration of some patterns and materials used to make a typical, conventional unreinforced graphite composite shaft for a fishing rod. For example, the Graphite Composite Material identified as NCT303-G120(MR40)-24 Newport is simply a commonly available graphite prepreg having 120 grams of graphite fibers per square meter of material. Other similar graphite prepregs could be used in place thereof. Accordingly, such patterns 40, 42 and 44 could be varied in shape and composition as long as base shaft 6 is manufactured at least partially from some plies of layers of graphite composite materials.

As can be seen in FIG. 3, pattern 46 forming reinforcement layer 32 has a diamond shape comprising a first portion 47 and a second portion 48. First portion 47 begins at a truncated first end and then tapers outwardly to an area of maximum width that forms the termination point 49 of first portion 47. The second portion 48 tapers continuously inwardly from the termination point 49 of first portion 47 to the far end of pattern 46. For reinforcement purposes, most of the reinforcement effect is provided by first portion 47 thereof, as the taper in the second portion is to feather out reinforcement layer 32 into the base shaft 46.

The shape of pattern 46 is so designed in relation of the taper of tip 26 that first portion 47 will concentrically surround the tip 26 of base shaft 6 in a single substantially continuous layer as shown in FIG. 2. The second portion 48 decreases continuously in width and thus does not form a continuous layer around tip 26. Instead, second portion 48 gradually disappears as it feathers out into base shaft 6. Again see FIG. 2 where second portion 48 is shown as it feathers out into base shaft 6. This is the way the product would appear prior to being painted. After such painting, the feathering of reinforcement layer 32, while still present, would be visually obscured by the paint layer.

In terms of the overall length of shaft 6, which is shown in FIG. 2 at 1 (comprising 84.5 inches), first portion 47 of reinforcement layer 32 extends over approximately 20 inches. Thus, reinforcement layer 32 effectively extends over approximately the first 25% of fishing rod 30, which is the area of shaft 6 most prone to impact damage.

The exact length of reinforcement layer 32 on shaft 6 is not important as long as it covers tip 26 of shaft 6 in the areas most prone to impact damage. However, the Applicant has found that it is not desirable to cover the entire shaft 6 with reinforcement layer 32. Doing so will impart an undesirable plastic memory to shaft 6. In other words, if shaft 6 is bent and held in a bent position for a short period of time, shaft 6 will, if covered with an outer layer of Vectran reinforced composite material that runs the whole length of shaft 6, take a "set" and remain permanently bent.

The total quantity of the Vectran fibers in reinforcement layer 32 has also been found to be important. In the case of fishing rod 30 shown in FIGS. 2 and 3, it has been found that it is preferable to keep the total volume by weight of such Vectran fibers within the range of from 1% to 5%, and preferably about 2.5%, of the weight of the graphite fibers in the patterns 40, 42 and 44 comprising the base rod. This allows the Vectran fibers to provide optimum impact resistance without otherwise affecting the performance of fishing rod 30 in regards to sensitivity and flexural response. If the amount of Vectran fibers by weight exceeds 10% of the amount of the graphite fibers, the vibration damping characteristics of Vectran will adversely affect the feel and flexing of fishing rod 30.

As noted above, the pattern 46 is shaped when wrapped around the base rod to provide a reinforcement layer 32 having a single ply or thickness over the area covered by the first portion 47 of pattern 46. In addition, the Vectran fibers in reinforcement layer 32 are oriented at 0° because the sheet like material incorporating the Vectran fibers is easiest to cut in this direction. However, since the Vectran fibers are not being utilized for the basic structure of shaft 6, that being provided by the graphite composite material, the orientation of the Vectran fibers within reinforcement layer 32 is not critical and could be at other angles relative to the horizontal center line of shaft 6.

Referring more particularly to FIGS. 4 and 5, a second embodiment of the invention is shown comprising a graphite composite shaft used to form a golf club 50. FIG. 4 illustrates the lower end of the golf club where shaft 6 of the club attaches to the hosel 52 of club head 54. Again, the reinforcement layer at tip 26 of shaft 6 is identified as 32. Only the lower portion of golf club 50 having reinforcement layer 32 at tip 26 is shown. Golf club 50 will extend a considerable distance upwardly therefrom to terminate in an opposite or upper end having a grip that the golfer uses to hold golf club 50.

FIG. 5 is a depiction, similar to FIG. 3, of the various patterns 60, 62, 64 and 66 of materials which are used to make a typical graphite composite shaft 6 that is useful in a golf club 50 as shown in FIG. 4. Again, in making such shaft 6, the manufacturing method depicted in FIG. 1 is employed. Thus, the material patterns as shown in FIG. 5 will be wrapped around mandrel 12 in the order shown with the uppermost pattern 60 in FIG. 5 being wrapped first and then proceeding progressively downwardly from top to bottom with the lowermost pattern 66 being wrapped last. Thus, the lowermost pattern 66 in FIG. 5 will comprise the outermost pattern or layer on the finished shaft 6.

Referring again to FIG. 5, each pattern 60–66 may comprise a single ply or multiple plies as identified below:

TABLE II

| Pat. No. | Ply Count | Fiber Orientation | Material Description |
|---|---|---|---|
| 60 | 2 | +45°, –45° | Graphite Composite Material NCT303-G120(MR40)-24 Newport |
| 62 | 3 | 0°, +45°, –45° | Graphite Composite Material NCT303-G120(MR40)-24 Newport |
| 64 | 1 | 0° | Graphite Composite Material F515-7:35% T2G-120-24 Hexcel |
| 66 | 1 | 0° | NCT - 301 Newport Vectran |

There are some obvious differences in reinforcement layer 32 as used in the shaft 6 in golf club 50 as compared to that of shaft 6 in fishing rod 30. Again, the second portion 48 of reinforcement layer 32 rapidly tapers down to a tip to help feather reinforcement layer 32 into shaft 6. Thus, most of the actual reinforcement effect is provided by the first portion 47 of reinforcement layer 32. However, unlike the case of fishing rod 30, the first portion 47 of reinforcement layer 32 derived from pattern 46 does not comprise a tapered triangle shape, but rather tapers somewhat outwardly to terminate in a blunt and flat front end that is quite wide. The purpose of this is to allow reinforcement layer 32 to provide two reinforcement plies or thicknesses at tip 26 in golf club 50 instead of the single ply provided in fishing rod 30. This is to allow additional reinforcement as needed to withstand the relatively greater impacts experienced at tip 26 of shaft 6 in golf club 50, i.e. where shaft 6 joins to club head 54.

Reinforcement layer 32 also need not extend as far upwardly on shaft 6 as is true in fishing rod 30 as the extent of the area of shaft 6 that is most prone to impact damage is relatively confined to the area where shaft 6 attaches to club head 54. Thus, the length of first portion 47 of reinforcement layer 32 in FIG. 5 is 4.50 inches compared to the 48.25 inches of nominal length of golf club shaft 6, resulting in coverage of approximately 10% of the length of shaft 6. With respect to reinforced shafts 6 used as golf club shafts, the Applicant has found that coverage of the first 10–15% of the shaft length is optimum. Moreover, and similar to what was discovered for a fishing rod shaft, a shaft 6 used in a golf club preferably has the total volume by weight of such Vectran fibers within the range of from 1% to 5% of the weight of the graphite fibers in the patterns 60, 62 and 64 comprising the base shaft.

In making a shaft 6 as used in a golf club, the manufacturing process might include a fiberglass scrim or screen that is rolled around the mandrel and extends the full length of shaft 6 as an outermost layer. The pattern for this scrim is not shown in FIG. 5, but would be below that of pattern 66. However, during subsequent finishing of such shaft, this scrim is sanded off and is not present in the finished shaft 6, leaving reinforcement layer 32 as the outermost layer at the tip of shaft 6. Accordingly, for the sake of clarity, this scrim has not been illustrated in FIG. 5.

The composite shafts described in this application exhibit vastly improved tip breakage characteristics. Put simply, the use of a partial outermost reinforcement layer, whether in one thickness as in shaft 6 used in fishing rod 30 or a double thickness as in shaft 6 used in golf club 50, which layer is made from a composite material utilizing thermoplastic reinforcement fibers, such as Vectran, makes tip 26 of such shafts much less prone to impact damage. This desirable effect is achieved without changing the desirable performance characteristics of the shafts. Thus, shafts 6, and the end use fishing rod and golf club products made therefrom, will be much more durable and long lasting.

The length limitations described above for how far reinforcement layer 32 extends up shaft 6 apply to a finished shaft as used in either a fishing rod or golf club application. It is not unusual for the shafts 6 made from the patterns shown in FIGS. 3 and 5 to be trimmed somewhat at either end. Nonetheless, the length limitations expressed (i.e. approximately the first 25% of fishing rod 30 and approximately the first 10–15% of golf club shaft 6) hold true considering the trimmed shafts 6 used in the finished products.

Various modifications of this invention will be apparent to those skilled in the art. Accordingly, this invention is to be limited only by the appended claims.

I claim:

1. A shaft made of composite materials, which comprises:
    a base shaft made at least partially of graphite composite material disposed in at least one innermost layer, wherein the diameter and thickness of the innermost layer(s) forming the base shaft are equal to that of a product chosen from the group of products consisting of a fishing rod and a golf club, and wherein the base shaft has a predetermined length between opposed ends thereof; and
    an outermost reinforcement layer covering the innermost layer(s) forming the base shaft at one end of the base shaft, wherein the outermost reinforcement layer extends only partially up the base shaft from the one end thereof for a distance which is substantially less than the predetermined length of the base shaft, wherein the outermost reinforcement layer is made of a composite material having thermoplastic fiber materials therein, and wherein the type of thermoplastic fiber materials used in the outermost reinforcement layer, the length of the outermost reinforcement layer and the amount of thermoplastic fiber materials contained in the outermost reinforcement layer are chosen such that the outermost reinforcement layer provides a reinforced tip at the one end of the base shaft which has substantially increased resistance to impact breakage of the tip as compared to a base shaft without the outermost reinforcement layer but without substantially changing the flexural characteristics of the base shaft, and wherein the length of the outermost reinforcement layer does not exceed 25% of the predetermined length of the base shaft.

2. The shaft of claim 1, wherein the thermoplastic fiber materials comprise wholly aromatic polyester fibers.

3. The shaft of claim 2, wherein the wholly aromatic polyester fibers comprise Vectran fibers.

4. The shaft of claim 1, wherein the graphite composite material includes graphite fibers embedded in a resin matrix, and wherein the amount of the thermoplastic fiber materials by weight lies in the range of from 1% to 5% of the weight of the graphite fibers.

5. The shaft of claim 4, wherein the amount of the thermoplastic fiber materials by weight comprises approximately 2.5% of the weight of the graphite fibers.

6. The shaft of claim 1, wherein the reinforcement layer comprises a first portion beginning at the one end of the base shaft and extending along the base shaft to a termination point which is spaced by a first distance from the one end of the base shaft, and wherein the first portion substantially completely surrounds the base shaft to form at least one concentric layer of reinforcement material therearound.

7. The shaft of claim 6, wherein the reinforcement layer further includes a second portion extending further along the base shaft from the termination point of the first portion to a termination point of the second portion which defines a final termination point of the reinforcement layer, and wherein the second portion has a substantially continuously decreasing width as it extends between the termination point of the first portion and the termination point of the second portion to feather the reinforcement layer into the base shaft.

8. The shaft of claim 6, wherein the first portion of the reinforcement layer comprises a single wrap of the composite material around the base shaft to form a single concentric layer of reinforcement material at the tip of the base shaft.

9. The shaft of claim 6, wherein the first portion of the reinforcement layer comprises a double wrap of the composite material around the base shaft to form two concentric layers of reinforcement material at the tip of the base shaft.

10. The shaft of claim 6, wherein the first distance has a maximum value of approximately 15% of the predetermined length of the base shaft.

11. The shaft of claim 1, wherein the base shaft is tapered such that one end of the base shaft is wider and one end of the base shaft is narrower, and wherein the reinforcement layer is placed at the narrower end of the base shaft.

12. The shaft of claim 1, wherein the reinforcement layer concentrically surrounds the one end of the base shaft and forms an outermost layer at the one end of the base shaft.

13. A shaft made of composite materials, which comprises:

a base shaft made of composite material disposed in at least one innermost layer with the composite material forming the base shaft being reinforced by graphite fibers, wherein the diameter and thickness of the innermost layer(s) forming the base shaft are equal to that of a product chosen from the group of products consisting of a fishing rod and a golf club, and wherein the base shaft has a predetermined length between opposed ends thereof; and an outermost reinforcement layer covering the innermost layer(s) forming the base shaft at one end of the base shaft, wherein the outermost reinforcement layer is made of a composite material having thermoplastic fiber materials therein chosen from the group consisting of VECTRAN, SPECTRA, RAYON, polyester, and nylon, wherein the amount by weight of the thermoplastic fibers in the outermost reinforcement layer is from 1% to 10% of the weight of the sum of the graphite fibers contained in the innermost layer(s) forming the base shaft, and wherein the length of the outermost reinforcement layer does not exceed 25% of the predetermined length of the base shaft.

14. The shaft of claim 13, wherein the base shaft is tapered having a wider end and a narrower end, and wherein the one end of the base shaft that carries the outermost reinforcement layer is the narrower end of the base shaft.

15. The shaft of claim 14, wherein the reinforcement layer concentrically surrounds the one end of the base shaft.

16. The shaft of claim 13, wherein the thermoplastic fibers comprise Vectran fibers.

* * * * *